No. 608,411. Patented Aug. 2, 1898.
D. M. MOTHERWELL.
CULTIVATOR.
(Application filed Sept. 22, 1897.)
(No Model.) 4 Sheets—Sheet 4.
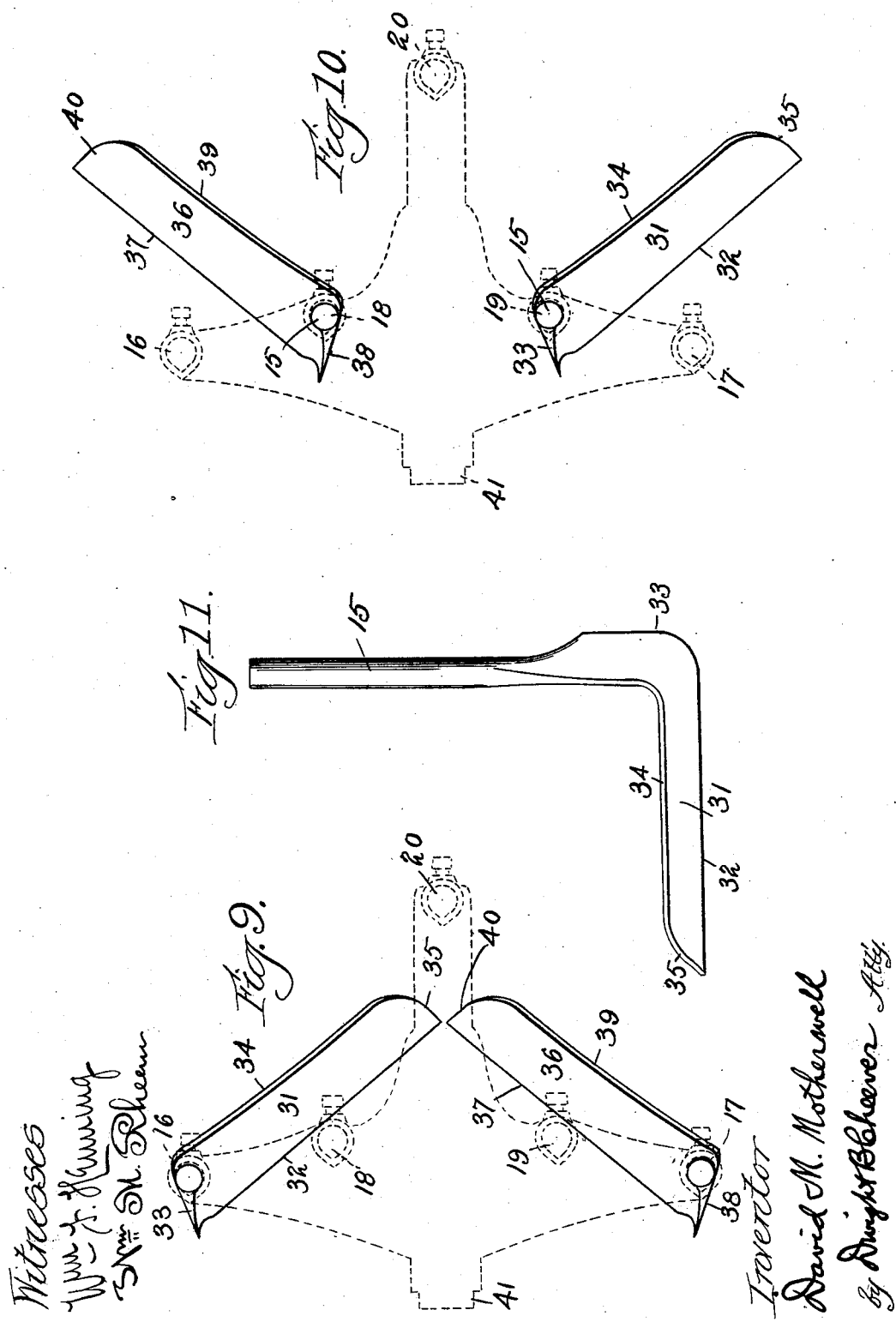

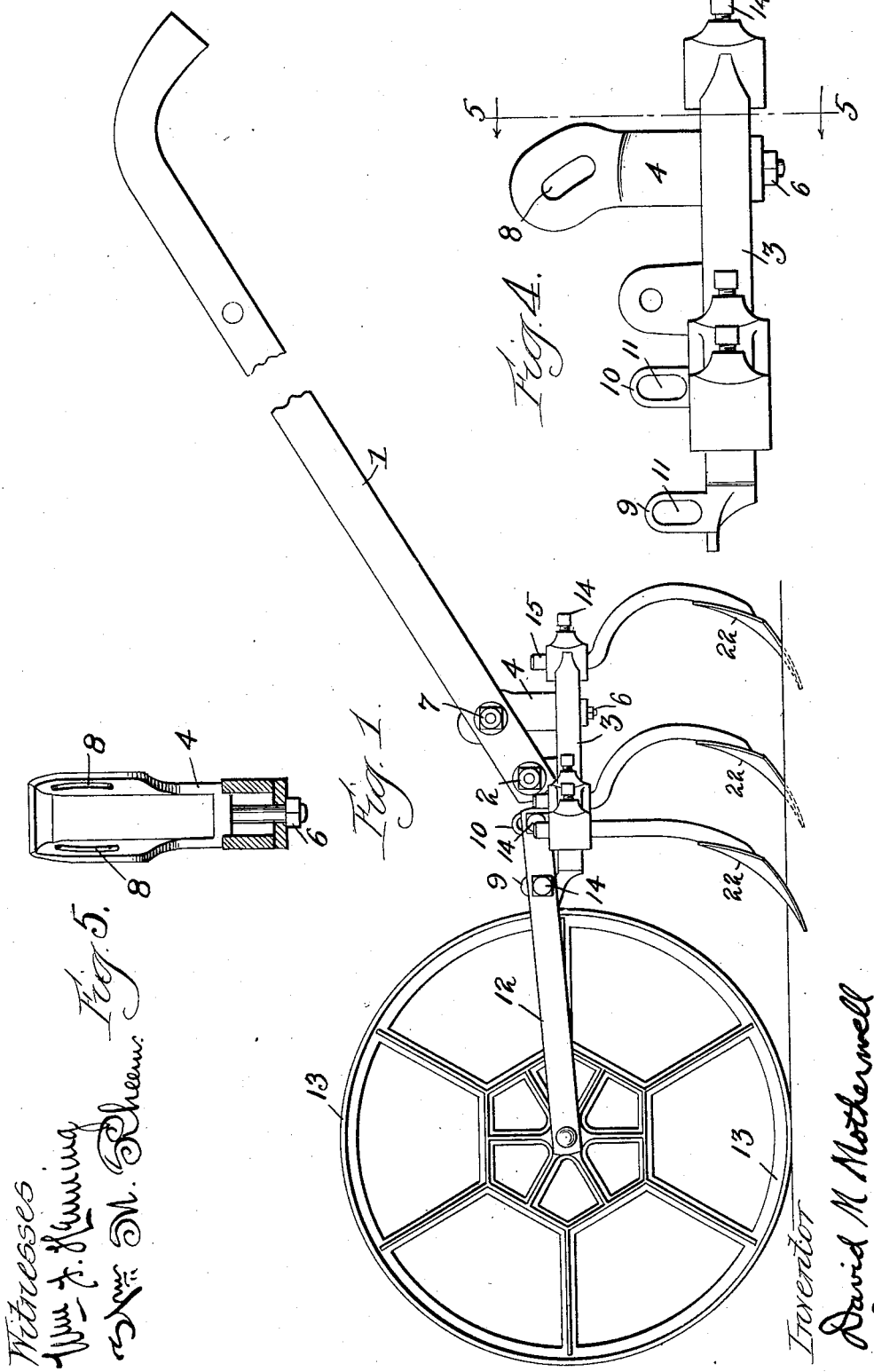

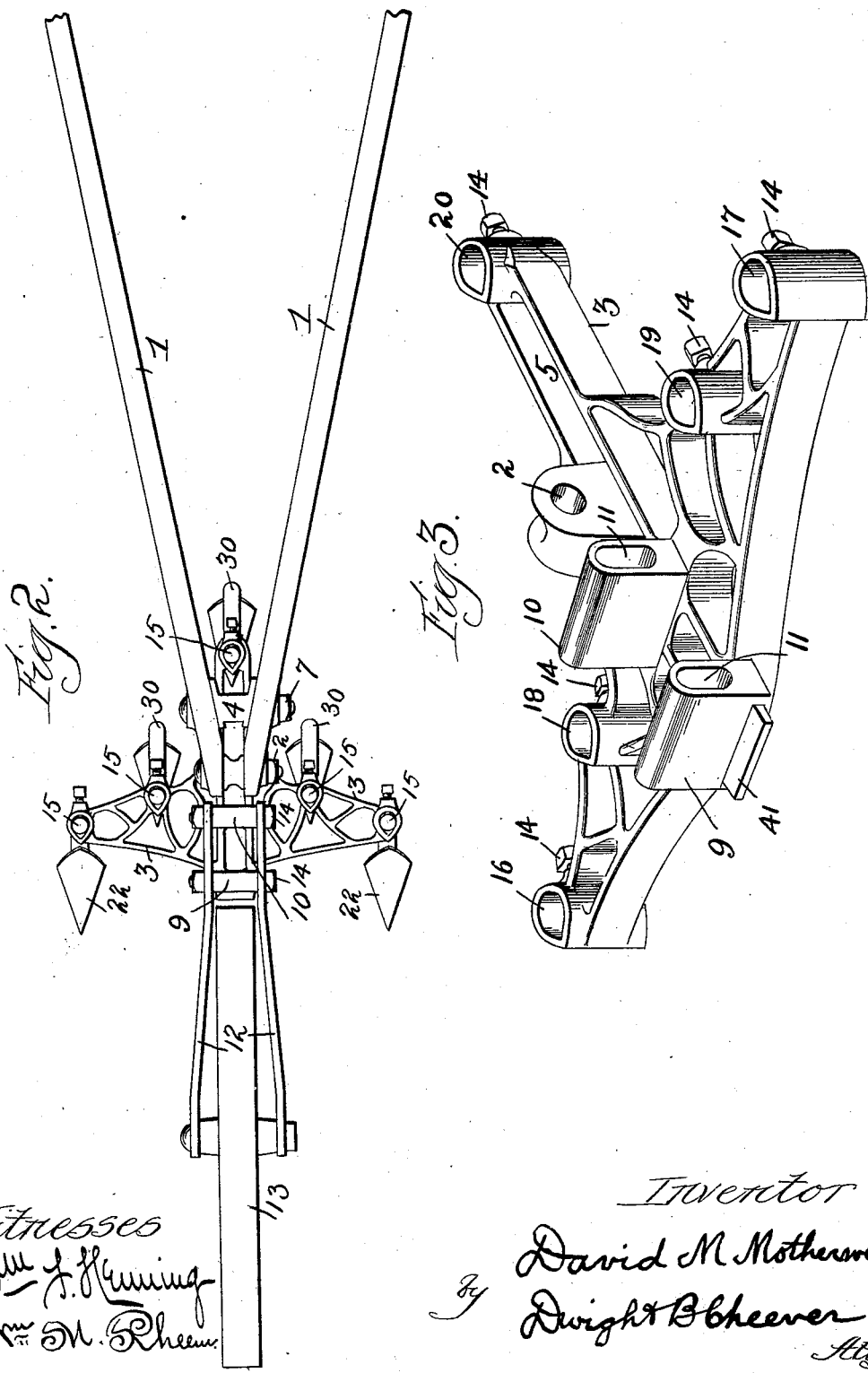

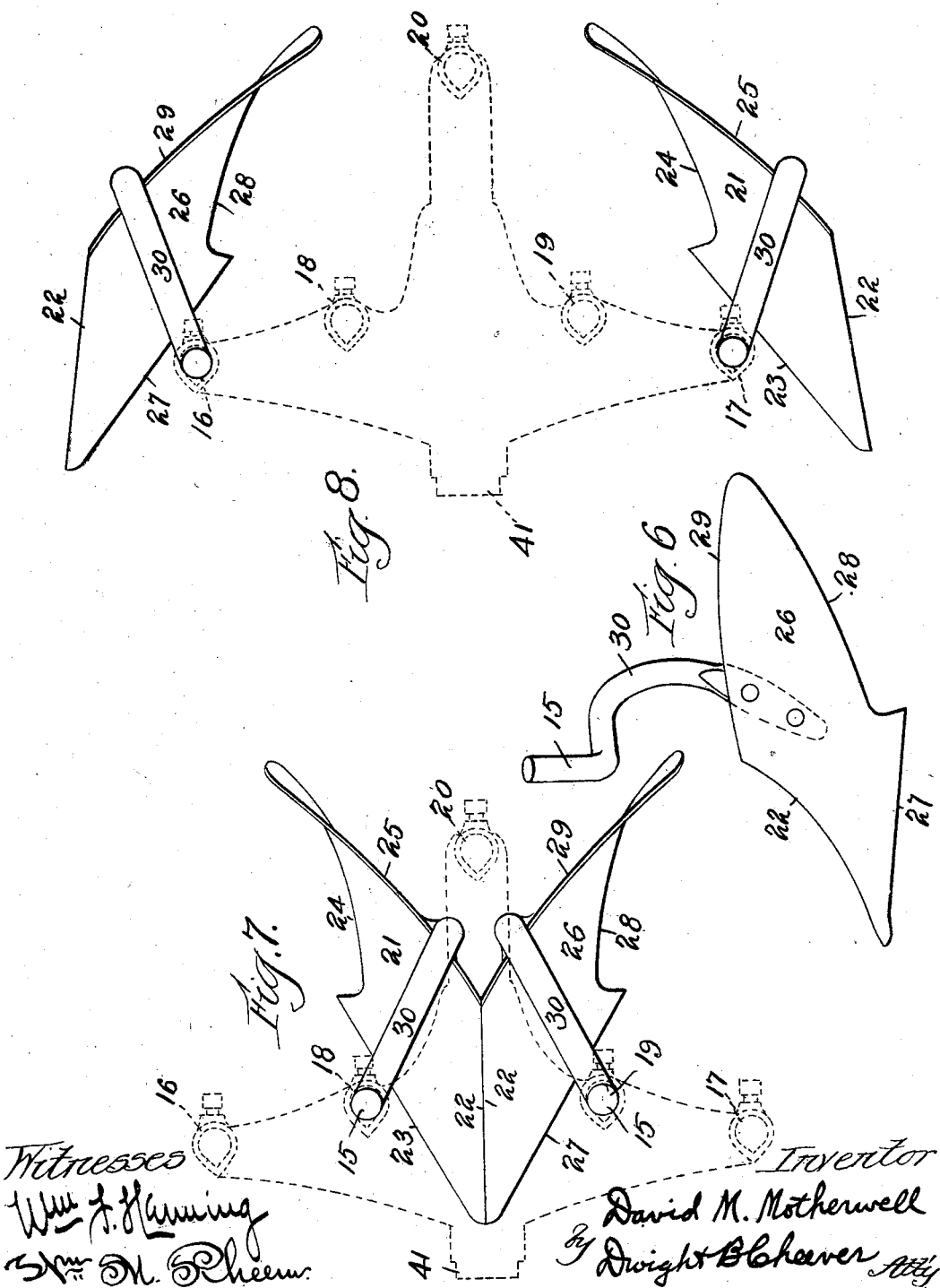

UNITED STATES PATENT OFFICE.

DAVID M. MOTHERWELL, OF CHICAGO, ILLINOIS, ASSIGNOR TO THE WHITMAN & BARNES MANUFACTURING COMPANY, OF AKRON, OHIO.

CULTIVATOR.

SPECIFICATION forming part of Letters Patent No. 608,411, dated August 2, 1898.

Application filed September 22, 1897. Serial No. 652,605. (No model.)

*To all whom it may concern:*

Be it known that I, DAVID M. MOTHERWELL, a citizen of the United States, and a resident of Chicago, in the county of Cook and State of Illinois, have invented a certain new and useful Improvement in Cultivators, of which the following is a specification in its best form now known to me.

My invention relates to cultivators, and is particularly adapted to garden-cultivators capable of being pushed by hand. Its object is to provide a convenient, compact, and efficient implement adapted to perform the successive operations necessary in preparing the ground for seed, covering the seed, removing the weeds, and lightening the soil, which can be economically constructed and readily converted to the several offices required of it.

It consists of a peculiarly-constructed frame, (best shown in Figure 3,) to which are connected the handles and wheel-fork and a series of working tools adapted to utilize the same supports in the frame and to occupy the various positions relative thereto required for the performance of the several offices of the implement and to assume different positions relative thereto, and in the manner of connecting and adjusting the different parts relative to each other.

It consists, further, in the construction of cultivator-tools specially adapted to work in combination with this frame, in the method of connecting the tools to the frame whereby they are rigidly secured and may be easily removed, and in details of construction hereinafter more particularly mentioned.

Fig. 1 is an elevation, and Fig. 2 a plan, of a cultivator. Fig. 3 is a perspective plan, and Fig. 4 a side elevation, of the tool-holding frame. Fig. 5 is an end view of strut 4, taken on line 6 of frame 3. Fig. 6 shows a plowing-tool. Figs. 7 and 8 show methods of arranging and attaching said plowing-tools to the tool-frame. Figs. 9 and 10 show methods of arranging and attaching weed-cutters to the tool-frame. Fig. 11 is a detail of a weed-cutter tool.

The handles $i$, by which the cultivator is pushed, are pivoted at 2 to a tool-frame 3, made, preferably, of cast-iron. The handle-frame is braced to the tool-frame by the base or strut 4, which is adapted to be moved forward or back in the slot 5 of the tool-frame 3 and fastened at any desired point by the bolt 6. A bolt 7 passes through the handles $i$ and slots 8 of the strut 4. By moving strut 4 back or forward and moving bolt 7 up or down in slots 8 any desired angle between the handles $i$ and the tool-frame 3 may be obtained. Cast on the tool-frame 3 are the lugs 9 and 10, having the slots 11. The forks 12 of the cultivator-wheel 13 are attached to the tool-frame by bolts 14 passing through the slots 11, and by changing the position of the bolts up and down in the slots the tool-frame may be raised or lowered relative to the wheel, thus changing the depth of cut by the working tools.

The tools are fastened in the tool-frame by the set-screws 14 clamping the tool-stem 15 against the angular sides of the sockets 16, 17, 18, 19, and 20 in the frame. These sockets are so arranged that when harrow-teeth are inserted they will work in lines parallel to the center of the cultivator, substantially equal distances apart, as shown in Figs. 1, 2, and 3, with sockets 18 and 19 back of sockets 16 and 17 and socket 20 well back of all the others, the shanks of the tools being so shaped as to enable them to be brought into the several positions required when supported in these sockets.

The frame consists, essentially, of the two lateral arms and a central rear arm, providing supports for the teeth, the rear arm also providing support for the handles and supports for the wheel-fork arranged centrally of the frame, which has also a central forward projection from which the forward support of the wheel-fork rises. A slot 5, formed in the rear arm, receives and supports the strut for the handles. This frame, including the slot for the reception of this strut, the slotted lugs for the support and adjustment of the wheel-fork, and the sockets in which the tool-stems are supported can be readily cast in one piece. It braces and supports all the parts efficiently, occupies little space, is economical of material, and by its cruciform shape enables all the parts of the various tools to be seen by the operator when pushing the implement. Combined with this frame is a plow made in two sections 21 and 26, one section forming by itself a right-hand plow and the other a left-hand plow, each section being so constructed that when placed in the position illustrated in Fig. 7 the line 22 of each will coincide and respectively brace each section laterally opposite its share, the two sections when in this position fitting snugly together and constituting a double plow with share and moldboard on each side turning in opposite directions. To each of these sections are secured peculiarly-formed shanks or standards, having an outward curve 30 between the section and stem 15, of such dimensions that when the stem 15 of the right-hand section is placed in socket 18 and the stem of the left-hand section in socket 19 the edges 22 of the two sections will be held firmly against each other in the position shown in Fig. 7, making a double-faced plow for opening the furrow, held securely together in proper working position without other fastening than is afforded by clamping them in the sockets by the set-screws 14. When the furrow is to be covered, these same plow-sections are placed in reverse position with their stems in socket 16 and 17, respectively, the section which was before on the left hand being transferred to the right side and that which was before on the right hand to the left, as shown in Fig. 8, when they are, by simply tightening the set-screws, held in suitable position to cover the furrows which they made when occupying their former position.

The weed-cutters have most of the cutting-blade approximately at right angles to the stem, bringing it about parallel to the plane of the frame, though the cutting-blade is extended upward at the base to the standard and the stems are adapted to fit into all the sockets of the frame. There are two other weed-cutters which are similar to each other, except that their blades extend in opposite directions. When the purpose is to operate the implement between the rows to cut or hoe out the weeds, the cutters are placed as shown in Fig. 9, where 36 represents the blade of one cutter and 31 the blade of the other, 37 being the cutting edge and 39 the rear edge of blade 36, and 32 the cutting edge and 34 the rear edge of blade 31. The stem of blade 36 is here in socket 17 and the stem of blade 31 in socket 16. When the purpose is to cut or hoe out the weeds on both sides of the row, the implement straddling the row, these cutters are transferred to the other sockets and reversed in position, as shown in Fig. 10. The stem of blade 36 now occupies socket 19, and the stem of blade 31 socket 18, and the blades extend outward and rearward instead of inward and forward, as in Fig. 9. Similar cutters may, if desired, be secured in the outer sockets, projecting correspondingly farther outward; but this is not usually desirable.

On the front of the tool-frame is cast a projection 41, which acts as a scraper to scrape dirt and mud from the cultivator-wheel.

Having thus described my invention, what I claim as new, and desire to secure by Letters Patent, is—

1. In a cultivator the two plow-sections having shares turning in opposite directions adapted to brace each other laterally and form a double plow, the shanks adapted to support them alternately in said position or in position for covering with their shares facing inward, and the main frame having sockets adapted to clamp and support the shanks in each position, substantially as and for the purposes described.

2. In a cultivator the main frame having lateral wings containing inner and outer sockets for the reception of the stems of tool-shanks, a rearward projection for the reception of the handle-supporting strut, having also a socket for the reception of the stem of a tool-shank, a central lug for the handle attachment, and slotted lugs for the support and adjustment of the wheel-fork, in combination with the handles, wheel-fork and shanks of working tools adapted to fit said sockets, substantially as and for the purposes described.

3. In a garden-cultivator a main tool-frame having two slotted lugs in which the wheel-forks are adapted to be fastened and adjusted, another lug to which the tool-handles are adapted to be pivoted, a slot adapted to receive a strut for the tool-handles and to allow said strut or base to be moved back or forward and fastened in different positions, a series of sockets substantially perpendicular to the plane of the tool-frame adapted to receive the stem of working tools, and means for fastening said tool-stems in said sockets, substantially as described.

4. In a garden-cultivator the combination of a tool-frame and handles pivoted thereto, a slot in said tool-frame adapted to receive a brace or strut for said handles and to allow said strut to be moved back or forward, means for fastening said strut in said slot, a slot in the upper end of said strut and a bolt passing through said slot and through the handles adapted to move up and down in said slot and fasten said handle-frame to said strut whereby the angle of said handle-frame to said tool-frame is adjusted, substantially as described.

5. In a garden-cultivator a tool-frame having a series of sockets having an angle and a set-screw opposite said angle, said sockets being substantially perpendicular to the frame equal distances apart, in combination with a right and left handled plow having stems adapted to fit in two of said sockets forming a double-faced plow and also adapted to be removed and fit in two other sockets and when so arranged cover the furrow made by said double-faced plow, substantially as described.

6. In a garden-cultivator the combination of a tool-frame having slotted lugs for the support and adjustment of the wheel-fork, another lug to which handles are pivoted, means for adjusting the angle of said tool-frame to said handle-frame, a wheel attached to said tool-frame, means for adjusting said wheel relative to said tool-frame, a series of sockets in said tool-frame adapted to receive the stems of various garden-tools and means for securing said tool-stems in said sockets, substantially as described.

DAVID M. MOTHERWELL.

Witnesses:
ROBT. K. S. CATHERWOOD,
DWIGHT B. CHEEVER.